US012529881B2

(12) United States Patent
Autourde et al.

(10) Patent No.: US 12,529,881 B2
(45) Date of Patent: Jan. 20, 2026

(54) ILLUMINATION SYSTEM, ASSOCIATED USE, OBSERVATION SYSTEM AND METHOD FOR CREATING AN ILLUMINATION FIELD

(71) Applicant: Schölly Fiberoptic GmbH, Denzlingen (DE)

(72) Inventors: Cyril Autourde, Kunheim (DE); Julian Nehlich, Freiburg (DE); Johannes Bourbon, Freiburg (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 110 days.

(21) Appl. No.: 18/632,446

(22) Filed: Apr. 11, 2024

(65) Prior Publication Data

US 2024/0345378 A1 Oct. 17, 2024

(30) Foreign Application Priority Data

Apr. 13, 2023 (DE) .......................... 102023109270.7

(51) Int. Cl.
*G02B 21/36* (2006.01)
*G02B 21/08* (2006.01)
*G02B 21/20* (2006.01)

(52) U.S. Cl.
CPC ......... *G02B 21/361* (2013.01); *G02B 21/082* (2013.01); *G02B 21/20* (2013.01); *G02B 21/362* (2013.01)

(58) Field of Classification Search
CPC .... G02B 21/361; G02B 21/082; G02B 21/20; G02B 21/362
USPC ............................................................ 348/79
See application file for complete search history.

(56) References Cited

U.S. PATENT DOCUMENTS

| 2012/0013849 | A1* | 1/2012 | Podoleanu | A61B 3/1005 351/221 |
| 2019/0076008 | A1 | 3/2019 | Ueda et al. | |
| 2020/0096755 | A1* | 3/2020 | Peschka | G02B 6/0005 |
| 2021/0327770 | A1* | 10/2021 | Jiang | H01J 37/063 |
| 2024/0207974 | A1* | 6/2024 | Murphy | B23K 26/0648 |

FOREIGN PATENT DOCUMENTS

DE          3327672 C2    2/1986

* cited by examiner

*Primary Examiner* — Allen C Wong
(74) *Attorney, Agent, or Firm* — Volpe Koenig

(57) ABSTRACT

An illumination system (1), especially for medical applications, is provided which, using a light source (20) as a starting point and a beam splitter (11) in a free-beam optical unit, forms two illumination light arms (5a, 5b), by which a respective oblique illumination (25a, 25b), preferably an adaptive respective oblique illumination, can be realized. In the process, the arising illumination field (2) can be adapted to a current field of view of an associated imaging system (3) by an adjustable beam shaping optical unit (6) in the respective illumination light arm (5a, 5b).

19 Claims, 6 Drawing Sheets

ILLUMINATION SYSTEM, ASSOCIATED USE, OBSERVATION SYSTEM AND METHOD FOR CREATING AN ILLUMINATION FIELD

CROSS-REFERENCE TO RELATED APPLICATIONS

This application claims priority to German Patent Application No. 10 2023 109 270.7, filed Apr. 13, 2023, which is incorporated herein by reference as if fully set forth.

TECHNICAL FIELD

The invention relates to an illumination system for creating an illumination field in an object plane, in particular an illumination field with an approximately rectangular basic shape, as required in the use of associated conventional imaging systems based on rectangular image sensors. Thus, this illumination system can be used with an associated imaging system in particular, in order thus to form an observation or visualization system with integrated illumination. The illumination system comprises: a light source; a collimation optical unit serving the collimation of illumination light emitted by the light source; two illumination light arms which each form an illumination light beam path and each create an illumination field; and finally a beam splitter serving to split collimated illumination light emitted by the collimation optical unit into the two illumination light arms.

The invention also relates to a specific use of such an illumination system, to be precise for illuminating an object plane with an illumination field which is created by two overlapping oblique illuminations provided by the illumination system. In other words, the two oblique illuminations created by the respective illumination light arm overlap in the object plane to form the (overall) illumination field.

The invention also relates to a method for creating an illumination field in an object plane, wherein an illumination system according to the invention can preferably be used in this method.

Finally, the invention relates to an observation or visualization system which comprises an above-described illumination system and an associated imaging system, wherein the latter can be configured as a video camera and/or as an endoscope, as a microscope or as an exoscope, for example. For imaging purposes, the imaging system comprises an image sensor, preferably in a rectangular format, and may moreover also offer a variable optical zoom. The observation system is envisaged and suitable for medical applications in particular. For example, the observation system as a whole may be attached to a movable arm of a surgical robot. In this case, the robot is able to position the observation system at different working distances from an operating site to be observed, with the result that a surgeon can record live recordings of the operating site using the observation system and for example reproduce these on a monitor or any other suitable reproduction equipment.

BACKGROUND

Visualization systems, for example configured as a microscope, frequently have a so-called Köhler-type illumination, wherein LEDs are also used as illumination sources. A substantial problem of this approach consists in the resultant illumination field generally having a circular intensity distribution. In contrast thereto, associated camera systems typically make use of image sensors which have a rectangular active sensor area (now an aspect ratio typically is 16:9). Thus, the illumination field is not optimally adapted to the field of view of the associated camera system in such a case. This situation is aggravated when an optical zoom is realized in the imaging system. This is because this case leads to a variable field of view, and so the disparity increases in relation to the fixed illumination field.

A further disadvantage of Köhler-type illuminations is that an adjustable stop is typically used to set the aperture of the illumination system. Since this stop cuts off light rays at the edge, light absorption occurs in these regions and hence a heating-up of the illumination system. Moreover, some of the illumination light then is no longer available for the imaging, with the result that the efficiency of the illumination decreases.

Moreover, medical applications in particular suffer from the problem that a disparity between the illumination field and the field of view may lead to tissue heating up significantly on account of the illumination light; this should be avoided at all costs.

SUMMARY

Using this as a starting point, the invention is based on the object of providing a capable illumination system which can be used together with an optical imaging system, the latter configured as a microscope in particular. This illumination system should be easy to handle and be suitable in particular for use with a surgical robot. In this context, the invention also seeks to provide a suitable observation system which comprises such an illumination and imaging system.

In order to achieve this object, one or more of the features disclosed herein according to the invention are provided in the case of an illumination system. In particular, what the invention thus proposes to achieve the object in an illumination system of the type set forth at the outset is that the beam splitter is designed as a free-beam optical unit and that each of the two illumination light arms comprises a respective beam shaping optical unit and in each case a downstream projection optical unit in the respective illumination light beam path.

In the object plane illuminated by the illumination system, the two illumination light fields, in particular in the form of a symmetric oblique illumination from the left and right, may superimpose to form the desired illumination field, for instance with a rectangular basic shape. In this context, there need not necessarily be a complete overlap of the two illumination light fields; instead, this overlap may vary, for example as a function of a current working distance between said object plane and the illumination system.

Advantages of this illumination system include, firstly, the high light efficiency and, secondly, the option of designing the illumination field for a rectangular field of view of an associated imaging system comprising an image sensor with a rectangular active area. However, depending on application, the illumination field may also have an ellipsoid or oval configuration, especially if the edges of the illumination field need not be sharply delimited. This can be achieved by an appropriate choice of the lenses of the beam shaping optical unit, but also of the collimation optical unit.

For example, the end of a light guide or, for example, a light source, preferably an electronically controllable light source, such as an LED can be used as the light source. In the case of the configuration with optical fibers/a light guide, provision can preferably be made for an appropriate coupling point to be formed, into which the light guide end can be inserted. This coupling point can achieve a centration and a positioning along the optical axis of the light guide end, with the result that the end facet of the optical fiber comes to rest precisely at the focus of the collimation optical unit and optimal collimation is achieved.

The illumination system according to the invention can thus be configured as standalone hardware, with the result that the illumination system can fulfil its illumination function, i.e. in particular generate a desired rectangular illumination field, on its own, i.e. independently of other systems or additional equipment, in particular independently of an associated imaging system.

In this context, a free-beam optical unit can be understood to mean that the beam splitter receives and/or emits a light beam propagating in air, i.e. precisely not in an optical fiber such as a light guide, for example. Such a configuration is very advantageous for the efficiency of the illumination system because substantially fewer optical losses occur in comparison with optical fibers, for instance a Y-splitter.

In other words, the invention can consequently be used to obtain a modularly constructed illumination system which provides a homogenized illumination within an illumination field, in particular within a rectangular illumination field. In this case, the illumination field can be aligned with and/or adapted to a field of view (which may likewise be a rectangular) of an associated imaging system, especially a video camera.

Moreover, the invention proposes that the illumination system is modularly constructed from a plurality of independent optical assemblies, each of which is replaceable. Hence, the illumination system may for example comprise at least three optical assemblies, which adopt the functions of collimation, beam shaping (this assembly may comprise two independent assemblies) and projection. In this case, each of these assemblies is configured independently of the other assembly but can as a whole be taken from a housing of the illumination system and subsequently be reinserted/reinstalled into the housing. As a result, each of the assemblies can easily be replaced or serviced.

In order to enable a symmetric illumination, it is also proposed that the two illumination light paths or illumination light beam paths, which are formed by the two illumination arms, are preferably configured to be symmetric. In this case, the illumination light paths can be respectively arranged to the left and right of an imaging path of an associated imaging system. This approach is advantageous for the purpose of enabling a homogeneous illumination of very tight body cavities.

Moreover, it is possible to use only a single light source in the illumination system, wherein the illumination light provided by this single light source can be split between the two illumination light paths, i.e. the two illumination light arms, virtually without losses by means of the beam splitter, i.e. a free-beam optical unit (in contrast to Y light couplers based on light guides).

It may be a challenge in such an illumination system to correct a parallax error existing in relation to an associated imaging system. Such a parallax error arises when the illumination path is laterally offset from the imaging path. In this case, the parallax error increases when the work distance (=distance of the imaging system from the observed object) is chosen to be smaller and when the zoom ratio of the imaging system is chosen to be larger. As will be explained in detail below, the illumination system may therefore comprise at least one optical element, in particular at least one lens, which can be displaced laterally with respect to the optical axis of the illumination beam path in order to thus adapt the parallax angle (angle between the optical axis of the illumination system and optical axis of the imaging system), i.e. be able to correct or limit the parallax error.

According to the invention, the object can also be achieved by further advantageous embodiments as described below and in the claims.

For example, provision can be made for the entire illumination system to be accommodated in a housing which has a horseshoe shape or C-shape. In this context, it is preferable for the two illumination light arms to also form the horseshoe-shape/C-shape.

Further, it may be advantageous if the two illumination light arms are opposite one another and form an accommodation space therebetween. As will be explained in detail below, the accommodation space can serve to accommodate an imaging optical unit of an associated imaging system (between the two illumination light arms). In this case, provision can be made for at least one (in particular at least one respective) rotationally symmetrically designed optical lens of the respective projection optical unit to be cut off in an edge region facing the accommodation space. Therefore, the edge region of this lens may exhibit a straight profile in particular.

Cutting off the edge regions of the lens(es) of the respective projection optical unit (in the respective illumination light arm) makes space for the accommodation space, with the result that a compact overall system can be obtained. In addition to the compactness obtained thus, the cutting-off practice may also reduce a parallax angle between the optical axis of the illumination system and the optical axis of an associated imaging/visualization system used for imaging purposes. The parallax angle may for example be chosen above 2.0°, for instance near 2.5°, in order thus to largely prevent vertical illumination reflections (i.e. a reflection of the illumination light by a lens in the imaging beam path of the imaging system); however, without provision of the lateral curtailment of the projection optical unit, the parallax angle would have to be substantially greater and, in that case, might be too large under certain circumstances to allow an effective illumination within tight body cavities. The curtailment of the projection optical unit thus renders it possible to illuminate tight body cavities, in particular, with a small parallax angle and without shadows, in order to still enable optimal imaging even in such applications.

Particularly preferably, the accommodation space has an aspect ratio of at least 16:9 in cross section. This is advantageous in that this makes it possible to insert an imaging optical unit with this aspect ratio into the accommodation space, said imaging optical unit being suitable for fully illuminating an image sensor with the same aspect ratio.

Each of the illumination light arms may moreover comprise a deflection optical unit which deflects the illumination light emitted by the respective beam shaping optical unit to the respective projection optical unit. In this case, it is then preferable if a respective optical axis of the respective projection optical unit makes an angle with a plane in which the two illumination light arms are located.

In this context, a preferred configuration provides for illumination light emanating from the light source to propagate in said plane, first through the collimation optical unit, then through the beam splitter and, downstream thereof, through the respective beam shaping optical unit of the respective illumination light arm, and for said illumination light only to be diverted out of said plane by the deflection optical unit. For example, the optical axes of the two projection optical units may extend across the plane of the two illumination light arms, i.e. approximately at right angles to said plane in particular.

Moreover, the respective projection optical unit can be arranged or arrangeable (e.g. by pivoting or displacement) off-center in relation to an optical axis of the respective associated beam shaping optical unit. As a result, it becomes possible to form a respective oblique illumination in relation to the object plane.

According to a further configuration, provision is made for the respective beam shaping optical unit to comprise at least one respective microlens array which converts an intensity distribution of the illumination light created by the light source and incident on the microlens array into an emanating intensity distribution, preferably with a rectangular format. This approach allows the creation of a comparatively homogenous intensity distribution within the optionally rectangular illumination field when starting from a rotationally symmetric intensity distribution, as is frequently supplied by a light guide.

By preference, the respective beam shaping optical unit may in each case comprise a respective pair of two microlens arrays, wherein the microlens arrays may preferably have a common optical axis in that case. In this case, provision can be made for a distance between the two microlens arrays to be configured to be adjustable with the aid of a setting means. This is because changing the distance in this case allows adaptation of the respective size of the respective illumination field (in particular rectangular illumination field) created by the respective illumination light arm.

Consequently, the illumination system according to the invention may comprise a so-called fly's eye homogenizer, also known by the term fly's eye condenser (FEC). This homogenizer comprises the above-described pair of two microlens arrays. In this case, the microlenses may by preference have a rectangular basic shape. In this case, the aspect ratio of the microlenses can preferably be chosen such that it corresponds to the aspect ratio of the active sensor area (e.g. 16:9) of an image sensor of the associated imaging system.

In this case, the two microlens arrays are separated from one another by an air gap. The size of this air gap is preferably adjustable. This is because this renders a zoom effect for the illumination field creatable, with the result that the size of the illumination field is adaptable while the aspect ratio of the illumination field can be substantially maintained (in the case of different distances between the microlens arrays). For example, said setting means can be configured as an actuatable actuator, by means of which the distance between the two microlens arrays is adjustable, preferably continuously adjustable. Accordingly, the illumination system may then comprise an interface configured to receive control commands for actuating the actuator.

For example, such control commands can be output by a central controller of the observation system (explained below), in particular of the imaging system. In this context, this controller may for example also control an optical zoom of the imaging system. What this can achieve is that the optical zoom of the imaging system and the adaptation of the illumination field are implemented in a manner adapted to one another and under automated control by the controller.

The respective beam shaping optical unit may also in each case comprise a condensing optical unit downstream of the respective at least one microlens array, i.e. in particular the aforementioned respective pair of two microlens arrays, in the respective illumination light beam path. In such a case, it is preferable for the respective condensation optical unit to be configured to create a respective intermediate illumination field, in particular a sharp and/or rectangular intermediate illumination field, in an intermediate image plane using the illumination light. However, in addition or as an alternative thereto, provision can also be made for the respective projection optical unit to be configured to project a respective intermediate illumination field into the object plane.

Said condensing optical unit may for example comprise at least one optical lens or at least two optical lenses in order to be able to create a high-quality intermediate illumination field. As a result, its intensity profile can be substantially restricted to a rectangle. Although not mandatory, the intermediate illumination field may be sharply delimited; i.e. intensity profiles in the intermediate image plane which only gradually taper to the edge are also conceivable. This may be configured accordingly depending on the requirements of the application and by all means be an acceptable technical compromise.

The respective projection optical unit may also comprise at least one optical element, in particular at least one optical lens, which is displaceably arranged, preferably across an axis of the respective illumination beam path. What can be achieved by such a configuration is that a respective parallax angle can be adapted by the displacement of the optical element.

This is because the respective optical axes of the two projection optical units may make an angle with respect to one another such that a (two-sided) oblique illumination is realized in that case. In this case, depending on the application, the angle may be for example at least 3.0°, preferably at least 4.0°, or else, for example if only flat objects are intended to be recorded, even at least 10.0°.

In other words, provision can thus be made in particular for a two-sided, in particular symmetric, oblique illumination to be providable using the illumination system.

Said included angle of the two optical axes of the two projection optical units can be adjustable, for example by displacing the displaceably arranged optical element already described above.

In this context, the invention has recognized that, depending on the application, there needs to be a respective compromise between the illumination of cavities which is as shadow-free as possible, i.e. the avoidance of shadows within cavities as a result of choosing a correspondingly small illumination angle, and the avoidance of vertical illumination reflections arising, the latter being able to be prevented precisely by choosing the illumination angle to be correspondingly large (and hence having a large parallax angle=angle between the respective illumination beam path and imaging beam path).

Thus, large parallax angles in particular are advantageous in the context of preventing vertical illumination reflections; however, if the intention is to illuminate tight body cavities, then the parallax angle must not be too large, i.e. the described angle between the axes of the two projection optical units will be comparatively small in that case. If the intention is to observe moist tissue with a high reflectivity in particular, it tends in turn to be necessary to choose/accept a relatively large angle of the oblique illumination and hence also a relatively large parallax angle because if parallax angles are chosen to be very small, then a frequently arising situation is one where illumination light is reflected back into the imaging optical unit by the tissue; this may have a significant adverse effect on the imaging. Consequently and depending on the current requirements, the described adaptability of the parallax angle always allows an optimal illumination to be provided with the illumination system.

In this case, the respective optical axis of the respective projection optical unit relates to the direction in which the respective projection optical unit emits the illumination light toward the object plane. In this case, each of the two axes may form a respective angle of incidence with respect to a surface normal of the object plane, with the result that the respective illumination light emitted by the projection optical unit is incident obliquely on the object plane in each case. Consequently, a symmetric oblique illumination is obtained if the two angles of incidence are chosen or set to be the same.

In a preferred configuration, provision is made for the beam splitter to be arranged centrally in relation to the two illumination light arms. In particular, this can be implemented such that optical path lengths of the two illumination light arms correspond.

According to an alternative configuration, the beam splitter can be arranged off-center in relation to the two illumination light arms. In this case, optical path lengths of different length may arise in the two illumination light arms. In such a case, it is then preferable for one of the illumination light arms to comprise an additional optical lens in order to compensate for a difference in the optical path lengths.

An observation system as described at the outset is also proposed for the purpose of achieving the aforementioned object. This system, which comprises an illumination system configured according to the invention, may in particular be configured such that at least a part of an imaging optical unit of the imaging system is inserted into an accommodation space (in particular as described above), which is formed by a housing of the illumination system. In this case, the imaging optical unit may be arranged centrally in relation to the two illumination light arms of the illumination system.

Provision can further be made for an optical axis of the imaging optical unit and optical axes of the two projection optical units to be located in a common observation plane.

In all such configurations, it is further preferable for the illumination system as a whole to be configured to be removable from the imaging system or for the imaging system as a whole to be configured to be removable from the illumination system It is understood that the imaging system itself need not emit any illumination light.

In other words, preference is consequently given to the imaging system and the illumination system not sharing any optical element with refractive power (however, for the purpose of protecting the respective optical unit, both systems may emit or receive light for example through a common planar coverslip which however has no relevant refractive power), and so the illumination beam path and the imaging beam path are strictly separated from one another. This is because such a modular construction substantially facilitates a replacement of components and the testing of components of the observation system because the imaging system and the illumination system, in each case considered on its own, are fully functional and hence can be operated, tested and serviced or repaired independently of the respective other system.

The imaging system may comprise a corresponding focusing optical unit. As a result, it is possible that the imaging system can create sharp images within a work region of differently large work distances from the object plane (which is imaged on the image sensor by the imaging system). In this case, a central plane can be located in the middle of this work region and the illumination system can be precisely designed such that the two illumination fields created by the two illumination light arms completely overlap in the central plane.

An advantage of such a configuration is that a sufficient correspondence between the field of view of the imaging system and the illumination field can be obtained over the entire work region, even without adapting the size of the illumination field.

In order to achieve the object, a method for creating an illumination field is also proposed, wherein an illumination system according to the invention can advantageously be used in this method. The method is distinguished in that illumination light emitted by a light source and collimated by a collimation optical unit is split between two illumination light arms by means of a beam splitter embodied as a free-beam optical unit. Subsequently, the illumination light split thus is initially shaped by means of a respective beam shaping optical unit in each of the two illumination light arms such that a respective intermediate illumination field is created. In this context, this intermediate illumination field can be sharp or else blurry and in particular have a rectangular format. Subsequently, the respective intermediate illumination field is projected into the object plane by means of a respective projection optical unit.

The above-described microlens arrays can also be used in this method: Thus, the respective intermediate illumination field can be created by means of at least one respective microlens array, but preferably by means of a respective pair of two microlens arrays (designed in particular as described above), wherein a downstream condensing optical unit downstream of the respective microlens array may also be involved in the creation of the intermediate illumination field. This is because the light source used in the method might for example create a rotationally symmetric and/or non-rectangular intensity distribution of illumination light. Then, this intensity distribution can be transformed accordingly by means of the microlens array, with the result that a desired intensity distribution, in particular a rectangular intensity distribution, can be created in the object plane.

The illumination light emitted by the respective projection optical unit may in this case be incident on the object plane at a respective angle of incidence (measured with respect to a surface normal of the object plane). Then, a respective oblique illumination is formed as a result.

Optionally, the respective angle of incidence at which the respective illumination light emitted by the respective projection optical unit is incident on the object plane can also be adapted by virtue of an optical element of the respective projection optical unit, in particular at least one optical lens, being displaced, to be precise by preference across a respective optical axis of the respective projection optical unit. For example, using this approach, it is possible to modify the angle of incidence of the respective oblique illumination of the left and right illumination light arm within a range of [2.0° to 10.0°] or for example of [2.5° to 7.5°]. This renders the illumination system usable in numerous different applications.

Finally, a brief explanation should also be given as to how an illumination system according to the invention can be advantageously used to illuminate an object plane with an illumination field which is created by two overlapping oblique illuminations provided by the illumination system at that time. To this end, provision is made for the two oblique illuminations to each form an angle of incidence with respect to a surface normal of the object plane which is at least 2.0° but preferably at least 3.0°. This is because this can prevent vertical illumination reflections, which would otherwise be created by a paraxial illumination, i.e. an illumination aligned parallel with the surface normal, from interfering with the imaging. As an alternative or in addition thereto, provision can also be made within said use for a size of the illumination field to be adapted by tuning the respective beam shaping optical unit of the illumination system, to be precise in response to an adaptation of an optical zoom of an associated imaging system. By preference, this adaptation can be implemented automatically by an electronic controller. Finally, within the scope of such a use, additional or alternative provision can be made for a respective angle of incidence of the respective oblique illuminations to be adapted by displacing an optical element of the projection optical unit. To this end, the optical element is preferably displaced across an axis of the respective illumination beam path.

BRIEF DESCRIPTION OF THE DRAWINGS

The invention will now be described in more detail on the basis of exemplary embodiments, but is not restricted to these exemplary embodiments. Further developments of the invention can be obtained from the following description of a preferred exemplary embodiment in conjunction with the general description, the claims, and the drawings.

In the following description of various preferred embodiments of the invention, elements that correspond in terms of their function are denoted by corresponding reference numerals, even in the case of a deviating design or shape.

In the figures:

Figure 1:
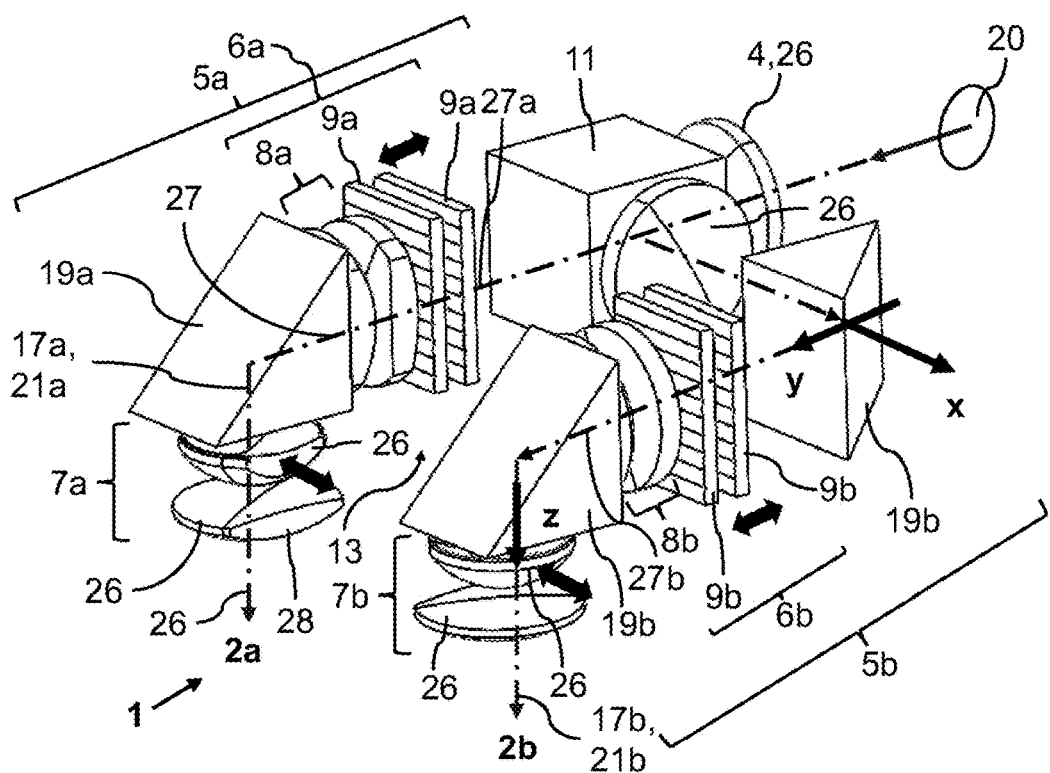
Figure 2:
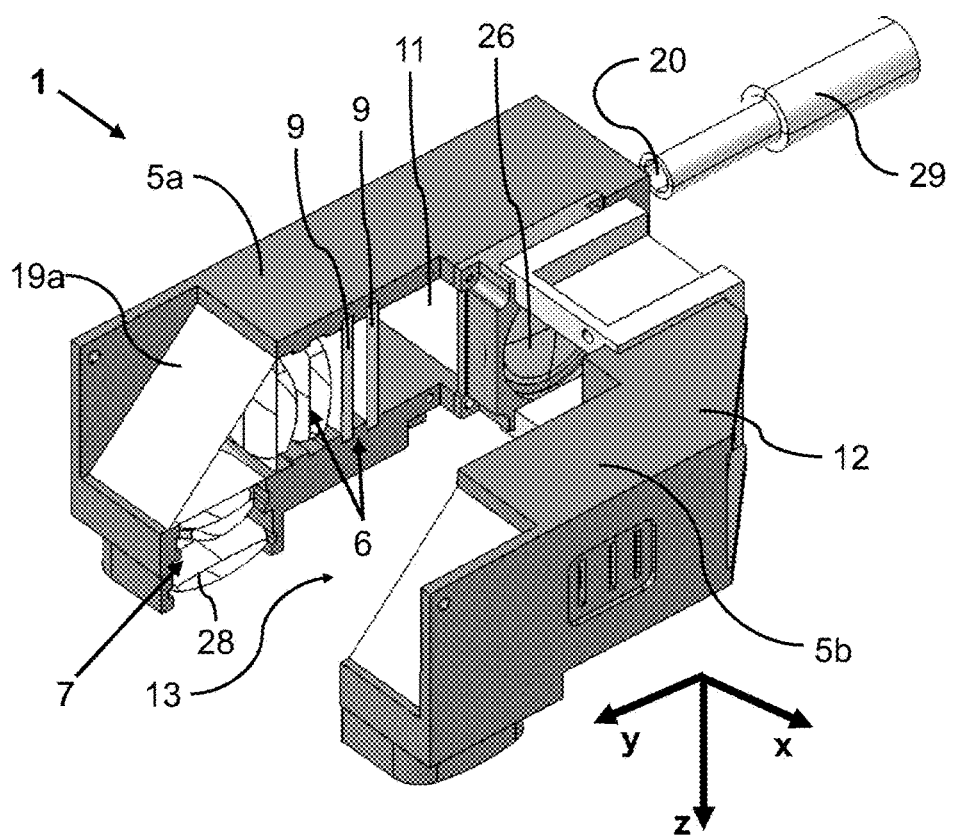
Figure 3:
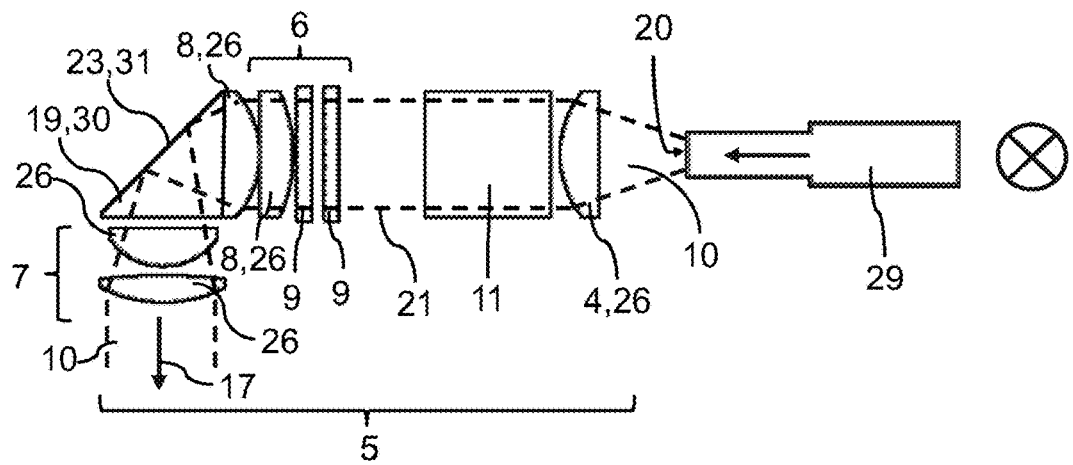
Figure 4:
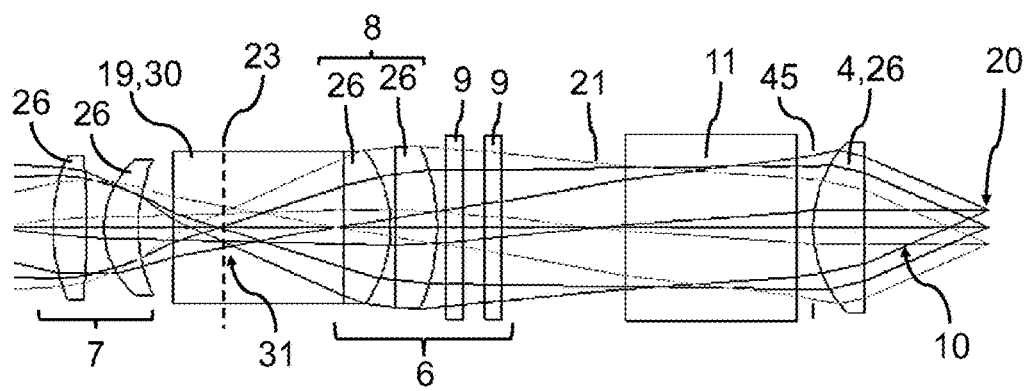
Figure 5A:
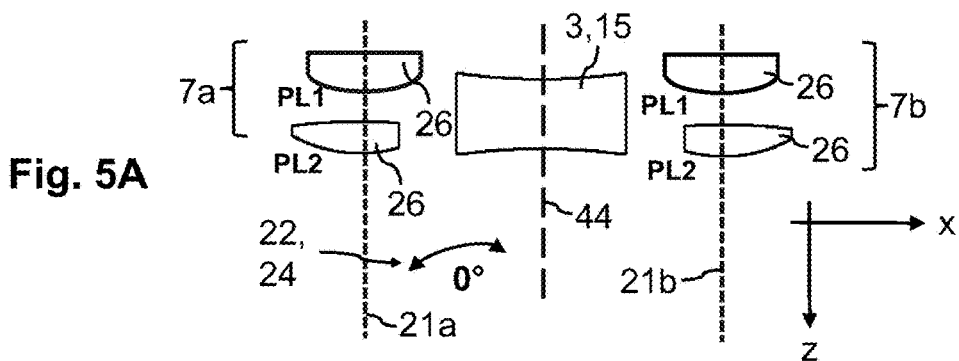
Figure 5B:
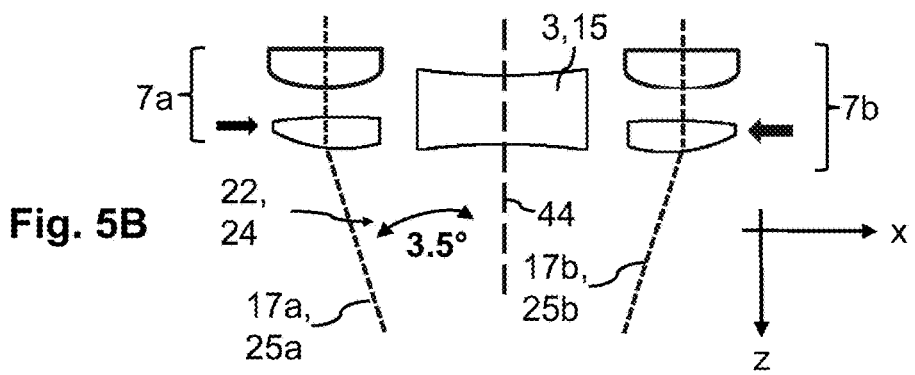
Figure 6A:
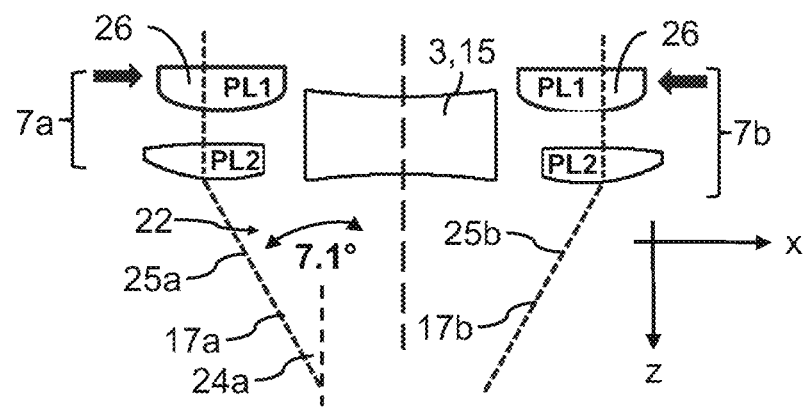
Figure 6B:
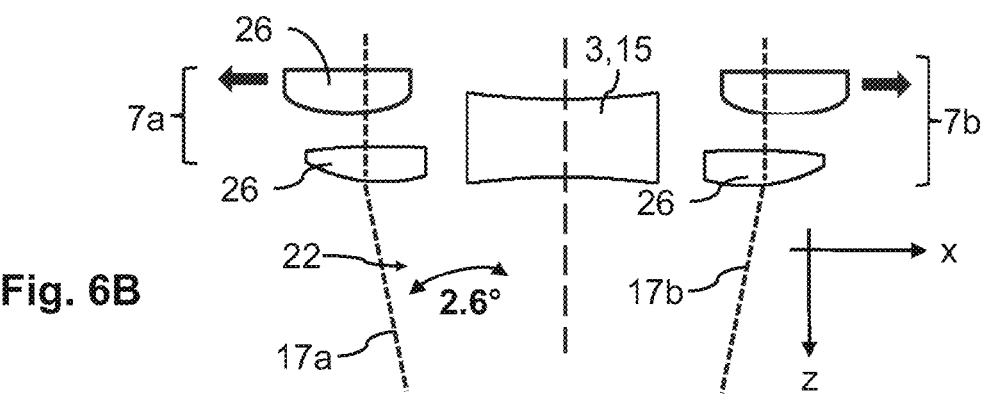
Figure 7:
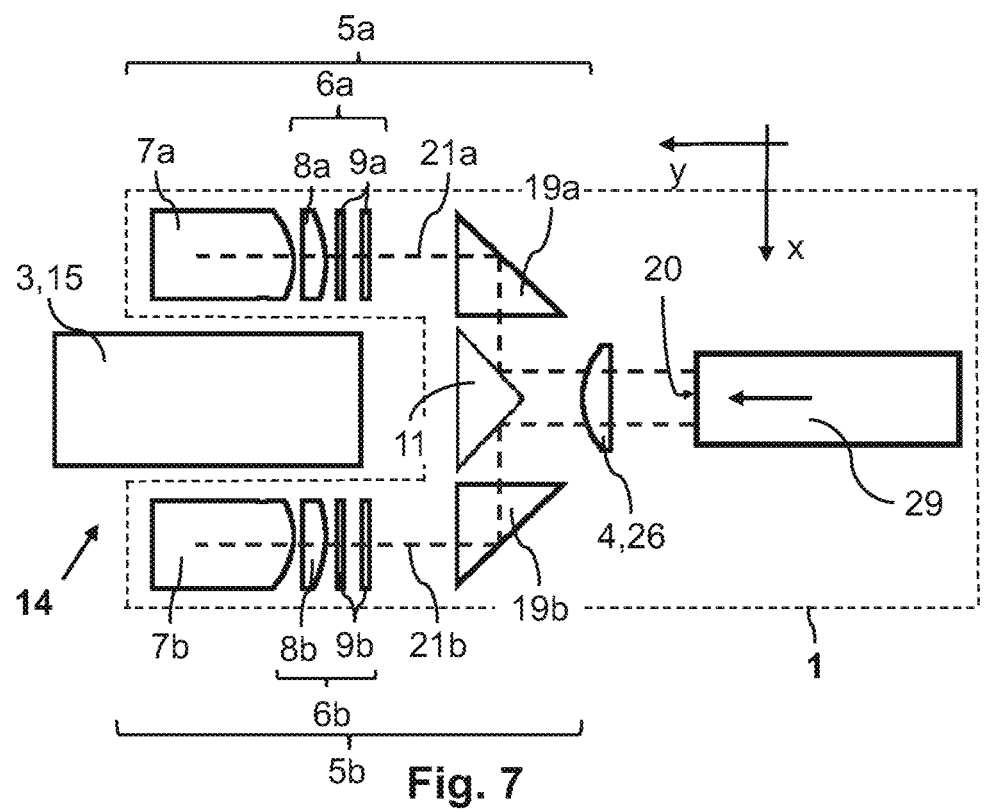
Figure 8:
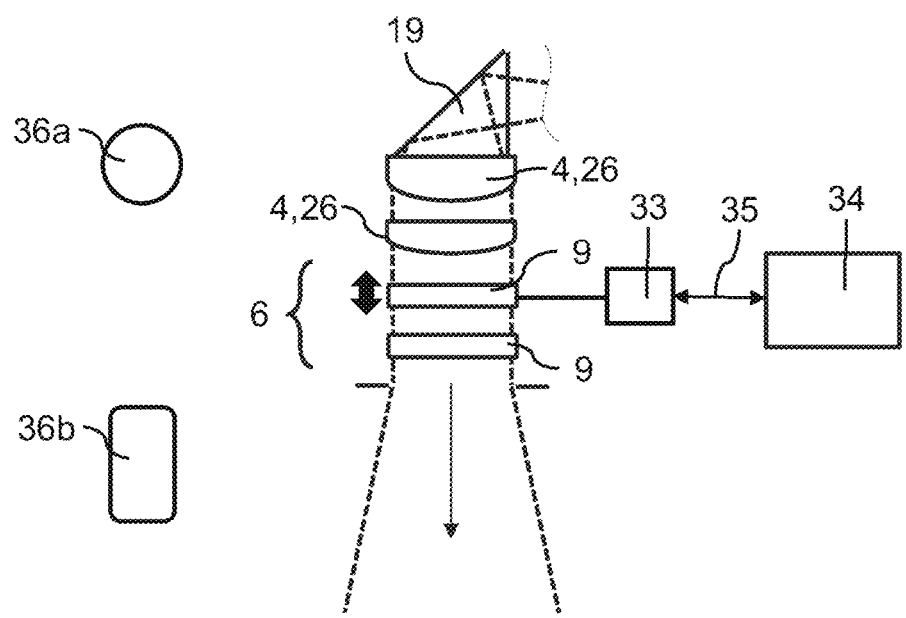
Figure 9:
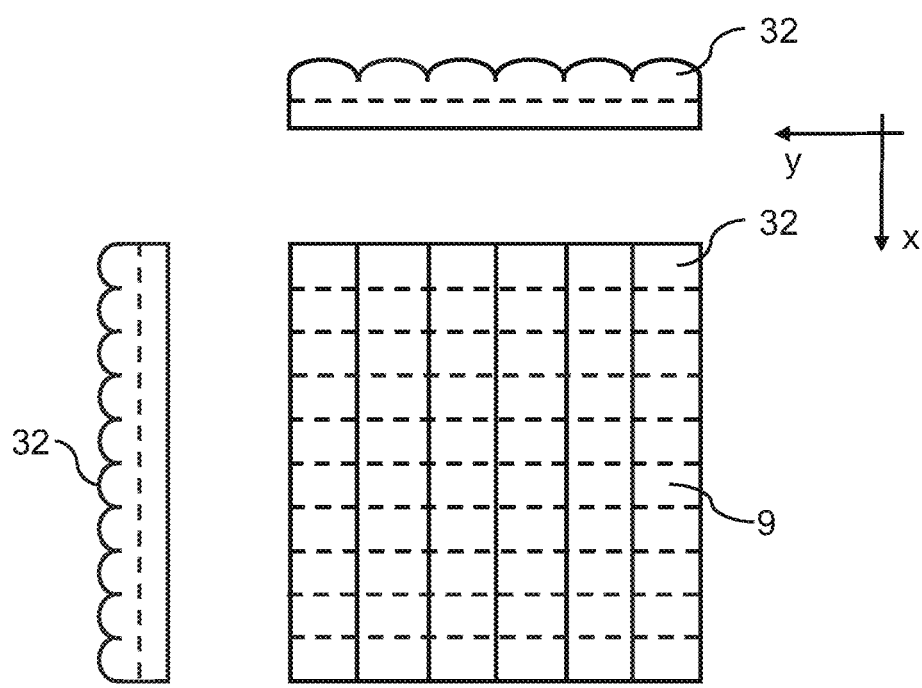
Figure 10:
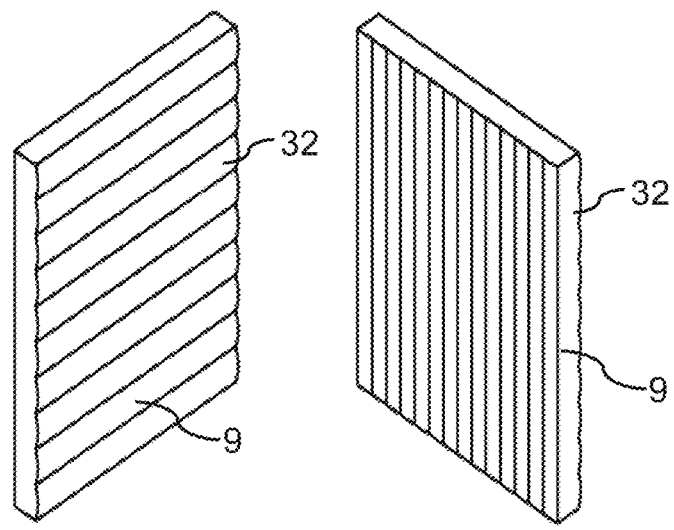
Figures 11A, 11B:
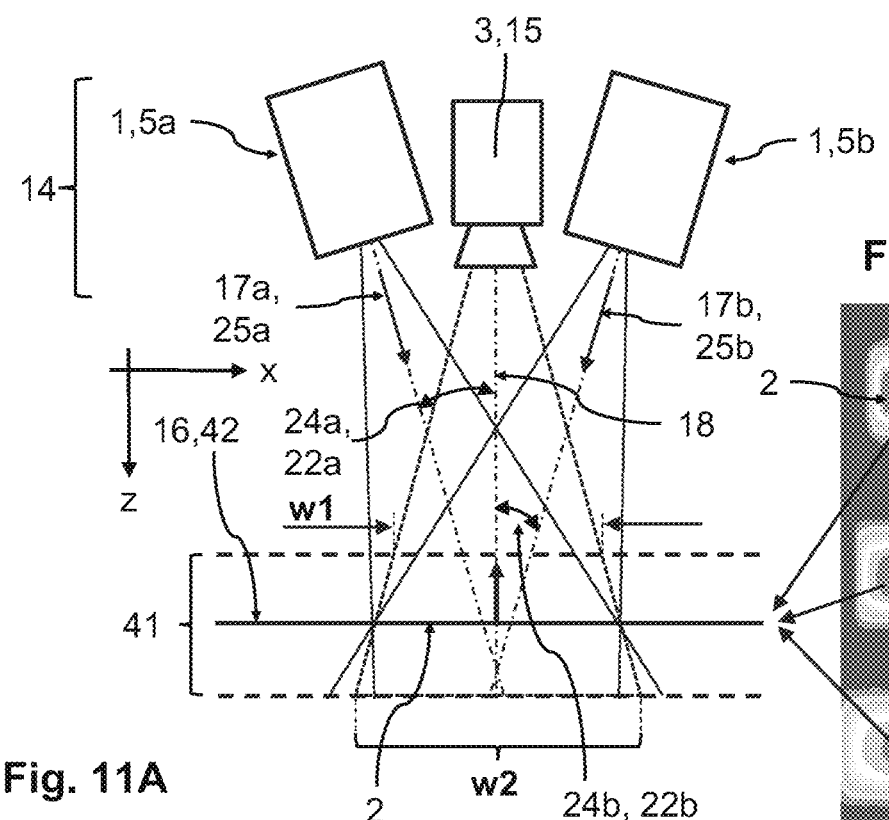
Figure 12:
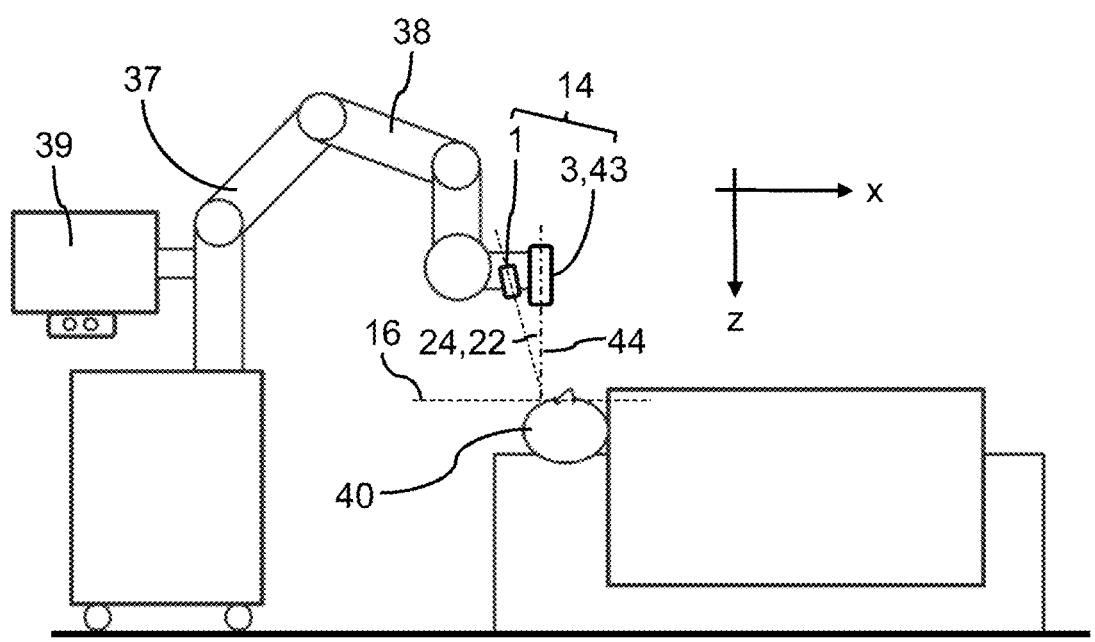

FIG. 1 shows the schematized components of an illumination system according to the invention, FIG. 2 shows the illumination system from FIG. 1 in a more realistic constructional representation in a completely assembled state, FIG. 3 uses a simplified representation to explain the course of the illumination beam path in one of the illumination light arms of the illumination system from FIGS. 1 and 2, starting from an end face of a light guide which serves as a light source, FIG. 4 shows an even more simplified representation of the illumination beam path through the optical components, already illustrated in FIG. 3, of the illumination system 1 from FIGS. 1 and 2, FIGS. 5A and 5B show the adaptation of the respective angle of incidence of the illumination light beam paths, which are created by the two illumination light arms of the illumination system from FIG. 1, by way of a respective lateral displacement of a second optical lens PL2 of the respective projection optical unit, FIGS. 6A and 6B show an approach slightly deviating from FIG. 5, in which it is not the lens PL2 of the projection optical unit arranged last in the beam path that is displaced laterally but a respective first optical lens PL1 arranged upstream thereof, FIG. 7 shows a very schematic view from above of an observation system according to the invention which comprises an associated imaging system 3 in addition to an illumination system 1 configured according to the invention, FIG. 8 shows a further possible configuration of an illumination system according to the invention, wherein only the last optical components in one of the two illumination light arms are illustrated, FIG. 9 shows two side views and a plan view of a microlens array, as can be used as part of the beam shaping optical unit in one of the two illumination light arms of an illumination system according to the invention, FIG. 10 shows a further example of a microlens array usable in an illumination system according to the invention, FIGS. 11A and 11B show a very schematic side view of an observation system 14 according to the invention, the latter producing images of an illuminated object plane 16 which is spaced apart from the observation system 14 at different working distances, and finally FIG. 12 shows a schematic sketch for illustrating a typical use situation, in which an illumination system according to the invention can be used sensibly.

DETAILED DESCRIPTION

FIGS. 1 and 2 show respective views of the optical components of an illumination system 1 configured according to the invention, the latter being provided to create an illumination field 2, which is illuminated by means of illumination light 10, in an object plane 16. The illumination system 1 comprises a light source 20, which is formed by the end face of a light guide 29 and transmits light with a rotationally symmetric intensity distribution. This illumination light 10 is collimated by a downstream collimation optical unit or optical collimator 4 before the light is incident on a beam splitter which distributes the collimated illumination light 10 between two separate illumination light arms 5a and 5b. As is quite evident from FIG. 1, the beam splitter 11 is configured as a free-beam optical unit, i.e. the illumination light 10 passes through air over a respective stretch between the collimation optical unit 4 and the beam splitter 11 and also downstream thereof between the beam splitter 11 and the respective first downstream optical unit 9a or 26 and is consequently precisely not guided within a light guide in these regions. In this case, the collimation lens of the collimation optical unit 4, which forms a first optical assembly, is configured as a planoconvex lens but could for example also comprise a plurality of lenses.

The second optical assembly of the illumination system 1, which comprises the two microlens arrays 9 that are preferably adjustable relative to one another along the optical axis, is used to convert the initially circular intensity distribution of the light source 20 into a rectangular illumination intensity pattern. In this case, the microlens arrays 9 may comprise cylindrical microlenses. The microlenses homogenize the collimated light beam and in the process destroy any spatial structure originating from the light source 20. As a result, this makes it possible to obtain a distribution of the illuminance which is very homogenous and approximately has a rectangular (in relation to the intensity curve) intensity profile (flat top).

If the distance between the two microlens arrays 9 forming a fly's eye condenser (FEC) is modified, then this can adjust the output-side numerical aperture of the beam shaping optical unit 6. As a result, this scales the size of the resultant illumination field in a manner similar to an optical zoom, with the rectangular shape of the illumination field and likewise the shape of the intensity distribution being largely maintained.

Subsequently, the light thus homogenized by means of the microlenses passes through a third assembly, which is referred to here as condensing optical unit 8 and which forms part of said beam shaping optical unit 6. This condensing optical unit 8 steers the illumination light 10 to the entrance pupil of the downstream projection optical unit 7 (optical projector).

The fourth and last optical assembly, described here as projection optical unit 7, may likewise comprise at least two optical lenses 26. In this case, provision can also be made for the light output by the condensing optical unit 8 to reach the projection optical unit 7 via a deflection optical unit 19 (e.g. in the form of a deflection prism), as shown in FIG. 1. Thus, the respective illumination beam path 21 of the illumination system 1 can be aligned with a small parallax angle in relation to an imaging beam path of an associated imaging system 3. Since the projection optical unit 7, in particular at least one or even both of its two lenses 26, can be moved across the optical axis 17, it is possible to correct the parallax (i.e. the angle between the axis of the imaging path and the respective illumination axis).

In this context, the optical unit made of condensing optical unit 8 and projection optical unit 7 enables the realization of the following optical functions: Firstly, an intermediate image plane can be created using the condensing optical unit 8. In particular, this allows an adjustable stop to be arranged in the intermediate image plane in order thus to adapt the size (not shown in the drawings) of the illumination field 2. Then, the projection optical unit 7 can project the intermediate image plane into the object plane 16 (=plane of the illumination field 2).

Moreover, it is possible to reduce the size of the exit aperture by means of the condensing optical unit 8, in order thus to minimize stray light effects. This is especially advantageous when tight body cavities are intended to be illuminated and the avoidance of unwanted light reflections is crucial. This is particularly advantageous when using illumination markers and other patterns that are used for machine vision (e.g. in nonmedical applications).

Consequently, the modular structure of the FEC and its use, in particular, is a characteristic of the illumination system 1 shown in FIG. 2. The latter can homogenize the beam, shape the beam and thus actively adapt/modify the illumination field 2.

In this context, the advantages of the solution according to the invention are as follows: The illumination field 2 can be adapted virtually perfectly to the field of view of the associated camera system 3, to be precise both in relation to its size and aspect ratio and in relation to its position, i.e. the centration. The illumination intensity in the object plane 16 can be configured to be very homogenous, which is especially important for fluorescence imaging, where a uniform excitation of the fluorophores is desirable. In this case, the available illumination light 10 is optimally used by the illumination system 1 for the purpose of illuminating the field of view observed by the imaging system 3, whereby a heating of the surrounding tissue in particular is avoided. Moreover, the illuminance in the illumination field 2 can be increased, especially when the camera system 3 implements zooming in, without this necessarily requiring an increase in power of the light source 20. In particular, by means of the illumination system 1, it is possible to illuminate tight body cavities without shadowing. Moreover, the system 1 is compact and light and can thus be fastened to a surgical robotic arm 38 in particular (cf. FIG. 12). A further advantage of the system 1 is that there is no relevant heating of the system 1 due to the utilized illumination light 10. Finally, it is possible to use cost-effective light sources 20 which precisely do not have a rectangular intensity profile. Finally, it is also possible to reduce the safety class of the illumination (on account of the high light efficiency), offering advantages to the user.

It is quite evident from FIGS. 1 and 2 that the right optical path leading from the beam splitter 11 to the right deflection optical unit 19b configured as a deflection prism is deflected in the y-direction by the latter. Subsequently, said beam path passes through a beam shaping optical unit 6b and, after a renewed deflection by means of a second deflection optical unit 19b likewise configured as a deflection prism, the right optical path runs in the z-direction, to be precise through a projection optical unit 7b comprising two optical lenses 26 which is downstream of the beam shaping optical unit 6b.

In analogous fashion, the left optical path starting from the beam splitter 11 passes through an analogously configured beam shaping optical unit 6 at first and then, after a first deflection in a first deflection optical unit 19a, through an analogously embodied projection optical unit 7, which once again comprises two optical lenses 26. Starting from a single light source 20, the illumination system 1 is thus used to create two separate illumination light beam paths 21a and 21b, which together illuminate the object plane 16 and generate the desired illumination field 2 there.

It is quite evident in FIG. 2 that the entire illumination system 1 is housed in a housing 12 which has a horseshoe shape or C-shape. In this case, the two illumination light arms 5a and 5b are opposite one another and between them enclose an accommodation space 13 in which it is possible to insert an imaging system 3 with an appropriate imaging optical unit 15, for instance as illustrated in FIG. 7.

Moreover, it is quite evident in both FIGS. 1 and 2 that the respective two lenses 26 of the left and right projection optical unit 7a and 7b are each cut off in an edge region facing the accommodation space 13, whereby space is created for the imaging optical unit 15.

It is also evident from FIG. 1 that the two illumination light arms 5a and 5b are located in the xy-plane but the respective optical axis 17a and 17b of the respective projection optical unit 7a and 7b makes an angle with respect to this plane, wherein the angle is 90° in this configuration example. This is because the respective front deflection optical unit 19a, 19b is provided in each of the two illumination light arms 5a and 5b in order to enable this, the front deflection optical unit deflecting the illumination light 10 emitted by the respective beam shaping optical unit 6a, 6b towards the respective projection optical unit 7a and 7b.

Since the beam splitter 11 is arranged off-center in relation to the two illumination light arms 5a, 5b in the example shown in FIG. 1, with the result that this accordingly yields optical path lengths of different length, an additional optical lens 26 which precisely compensates the difference in the two optical path lengths is arranged in the optical path between the beam splitter 11 and the first deflection optical unit 19b in the right illumination light arm 5b.

In the situation shown in FIGS. 1 and 2, each respective projection optical unit 7a, 7b is still arranged centrally in relation to the optical axis 27 of the beam shaping optical unit 6a, 6b arranged upstream thereof. Accordingly, the respective chief ray of the respective illumination light beam path 21a, 21b leaves the last lens 26 of the projection optical unit 7a, 7b in a manner axially parallel to the z-axis. However, as indicated by the block arrows, the upper/first of the two lenses 26 of the respective projection optical unit 7a, 7b has a displaceable configuration, and to be precise this respective lens 26 (denoted PL1 below) can be displaced across the respective optical axis 17a, 17b. Since the respective projection optical unit 7a, 7b thus is (at least in part) arrangeable off-center in relation to the respective optical axis 27 of the beam shaping optical unit 6a, 6b arranged upstream thereof in the beam path, as illustrated in FIGS. 5A, 5B, 6A and 6B, it is thus possible to form a respective oblique illumination 25a, 25b in relation to the object plane 16 by means of the respective left and right illumination light arm 5a, 5b.

This is illustrated by way of example and very abstractly in FIGS. 6A and 6B, which shows a side view of the two beam paths in the illumination light arms 5a and 5b, with the imaging optical unit 15 of the associated imaging system 3 inserted in the accommodation space 13 also being visible. If the respective first lens 26 (PL1) in the beam path of the respective projection optical unit 7a, 7b is displaced inwardly in the direction of the accommodation space 13, as shown in FIG. 6A, then it is possible to create an angle of incidence of the respective optical axis 17a, 17b of the left or right illumination light arm 5a, 5b of up to 7.1°. In this case, the angle of incidence 24 is measured with respect to the surface normal of the object plane 16 illuminated by the illumination light 10.

An alternative configuration thereto is shown in FIGS. 5A and 5B, where it is not the respective first lens 26 (PL1) arranged in the beam path but the second lens 26 (PL2) of the respective projection optical unit 7a, 7b which can be displaced laterally with respect to the optical axis. It is also evident here from the comparison of FIGS. 5A and 5B that the lateral displacement of the second lens 26, in each case in the direction of the imaging system 3 situated between the two illumination light arms 5a and 5b, allows the angle of incidence 24 to be varied between 0.0° and 3.5°. In this case, the angle of incidence 24 corresponds precisely to the parallax angle 22, which is found between the optical axis 44 of the imaging optical unit 15 and the respective optical axis 17a, 17b of the respective illumination light beam path 21a, 21b, specifically because the imaging system 3 views the illuminated object plane perpendicularly from above.

It is self-evident that the approaches according to FIGS. 5A, 5B, 6A and 6B can also be combined, i.e. according to the invention it is possible in particular to provide for the respective projection optical unit 7 in the left and right illumination light arm 5a, 5b to in each case comprise at least two optical elements/optical lenses 26 which are displaceable across the optical axis of the projection optical unit 7 in order thus to (continuously) adapt a respective angle of incidence 24 of the respective illumination light beam path 21. It is understood that when the approaches from FIGS. 5 and 6 are combined, the respective angle of incidence 24 can then be varied accordingly between 0.0° and at most 7.1°, with the result that a large range of different parallax angles 22 is settable.

The table below shows how the angle of incidence 24 can be varied by adapting the lateral position of the first lens (PL1) of the projection optical unit 7 in order to provide a respective suitable oblique illumination 25 for different working distances:

TABLE 1

| Working distance [mm] | 200 | 300 | 410 | 550 |
|---|---|---|---|---|
| Lateral Pos. PL1 [mm] | −1.7 | −0.6 | 0.0 | 0.4 |
| Angle of incidence [°] | 7.10 | 4.75 | 3.50 | 2.60 |

In the example of FIGS. 5A and 5B, the included angle between the two optical axes 17a, 17b which is caused by a lateral displacement of the respective second lens 26 (PL2) of the respective projection optical unit 7a, 7b can be up to 7°; by contrast, this angle is already more than 14° in the example of FIG. 6A.

FIG. 7 shows a schematic plan view of a further possible configuration of an illumination system 1 according to the invention, wherein, in contrast to the configuration according to FIGS. 1 and 2, the light source 20 here is arranged centrally in relation to the two illumination light arms 5a, 5b. After passing through the collimation optical unit 4, the illumination light 10 is split into the two illumination light arms 5a and 5b by means of a beam splitter 11, wherein the beam splitter 11 here is configured by means of completely reflective deflection surfaces whereas the beam splitter 11 from the example of FIG. 1 has a semi-transmissive con-figuration such that, in that case, the left illumination light arm 5, more precisely the optical path thereof, is transmitted through the beam splitter 11 there, i.e. passes the latter without deflection.

The case of a two-sided oblique illumination is also illustrated in FIGS. 11A and 11B again, albeit in a very schematic form. In a side view there, it is possible to identify the two illumination light arms 5a and 5b of an illumination system 1 according to the invention and also the illumination light beam paths 21a and 21b emitted by the latter, said illumination light beam paths precisely overlapping in the object plane 16 shown by way of a solid line. In this case, reference sign 41 denotes the work region in the z-direction within which the associated imaging system 3 is able to supply sharp images, specifically by virtue of setting a focusing optical unit of the imaging system 3 for the corresponding work distance from the current object plane 16. In this case, the solid line illustrates the central plane 42 in the middle of this work region 41, where the two illumination fields 2a and 2b created by the two illumination light arms 5a and 5b just completely overlap. The intensity distribution in the object plane 16 corresponding thereto is illustrated by reference sign 36b in FIG. 11B.

If the working distance now is reduced by virtue of the imaging system 3 focusing on an object plane 16 at the upper edge of the work region 41, then the respective size of the two illumination fields 2a, 2b can be adapted accordingly. To this end, the respective beam shaping optical unit 6a and 6b comprises a respective pair of two microlens arrays 9a, 9b, which have a common optical axis 27a, 27b as illustrated in FIG. 1.

As illustrated by way of example and in simplified fashion in FIG. 8 (albeit in that case for a slightly deviating configuration of an illumination system 1 according to the invention), a distance between the two microlens arrays 9a, 9b can be modified with the aid of a setting means such that the intensity distribution 36a shown in FIG. 11B arises. In the example of FIG. 8, the distance between the two microlens arrays 9a and 9b is adjustable therein by means of the actuator 33 shown there, which is actuated by way of a controller 34. In this case, the illumination system 1 comprises an interface configured to receive control commands for actuating the actuator 33, said commands then being processed by the controller 34 and transmitted to the actuator 33 in a suitable form.

The use of the two microlens arrays 9a and 9b in the respective illumination light arm 5a, 5b as part of the beam shaping optical unit 6, which additionally also comprises a condensing optical unit 8 consisting of two lenses in each case (cf. FIG. 1 and FIG. 2), moreover is advantageous in that the rotationally symmetric intensity distribution created by the light source 20 can be converted into an emanating intensity distribution 36a, 36b, 36c with a rectangular format in each case, as illustrated in FIG. 11B. In this context, said condensing optical unit serves to use the illumination light 10 to create a respective intermediate illumination field 31a, 31b in a respective intermediate image plane 23a, 23b. This intermediate illumination field 31a, 31b is subsequently projected by the respective downstream projection optical unit 7a, 7b into the object plane 16. For example, this is easily comprehendible on the basis of FIGS. 3 and 4, which, in simplified fashion, illustrate the corresponding illumination light beam path 21 for one of the two illumination light arms 5a, 5b. In this context, an optical stop 45 which is arranged between the projection optical unit 4 and the beam splitter 11 and which delimits the illumination light beam path 21 is evident in FIG. 4.

Thus, in the example of an illumination system 1 according to the invention shown in FIGS. 1 and 2, an intermediate illumination field 31a, 31b, which is subsequently projected into the object plane 16 by means of the respective projection optical unit 7a, 7b shown, is created in each of the two illumination light arms 5a, 5b by means of the respective beam shaping optical unit 6a, 6b, in particular the condensing optical units 8a, 8b shown.

However, control of the actuator 33 by the controller 34 for the purpose of bringing about a desired adaptation of the illumination is not limited to a response to an adaptation of the focal plane of the imaging system 3. Instead, it is also possible that the size of the illumination field 2 in the current object plane 16 is also automatically adapted by the controller 34 in response to an adaptation of an optical zoom of the associated imaging system 3, by virtue of said controller tuning the respective beam shaping optical unit 6a, 6b in the respective illumination light arm 5a, 5b, i.e. modifying the distance between the two microlens arrays 9a, 9b. This is shown in FIGS. 11A and 11B where it is evident that three different intensity distributions 36a/36b/36c can be created in the central plane 42, illustrated there, by way of an appropriate detuning of the two beam shaping optical units 6. It is understood that the two beam shaping optical units 6 are detuned synchronously and uniformly in the process.

It is easily comprehensible on the basis of FIGS. 9 and 10 that both cylindrical lenses and lenses with a rectangular aperture, as visible in FIG. 9, can be used in the respective microlens array 9. In this case, the respective microlens array 9 can form optical surfaces with relevant refractive power on one side or else on both sides.

FIG. 12 finally shows a corresponding use situation, in which an observation system 14 according to the invention, comprising an illumination system 1 according to the invention and an associated imaging system 3 in the form of a surgical microscope, is placed over the head of a patient 40 by means of a surgical robot 37, wherein the head of the patient forms the object plane 16 which is illuminated in an oblique illumination at the shown angle of incidence 24 using the illumination system 1. In FIG. 12, the surgical microscope 3 views the object plane 16 perpendicularly; however, it is also possible to realize oblique viewing angles by virtue of the surgical robot 37 tilting the optical axis 44 of the imaging optical unit 15 accordingly, wherein the two optical axes 17a and 17b of the illumination system 1 are also tilted along accordingly in that case because the robot 37 moves the observation system 14 as a whole in space.

In a situation as in FIGS. 11A and 11B, the field of view will be correspondingly smaller in the case of a short working distance (x-width w1 in FIG. 11A) than in the case of an increased working distance (x-width w2 in FIG. 11A). The same also applies if an optical zoom factor is modified in the imaging system 3. These changes in the field of view can be taken into account by way of an appropriate adjustment of the illumination field 2, wherein FIG. 11B illustrates that the size of the illumination field 2 can be adapted by detuning the respective beam shaping optical unit 6 even in the case of a constant working distance.

LIST OF REFERENCE SIGNS

1 Illumination system
2 Illumination field
3 Imaging system
4 Collimation optical unit
5 Illumination light arm
6 Beam shaping optical unit
7 Projection optical unit
8 Condensing optical unit
9 Microlens array
10 Illumination light
11 Beam splitter
12 Housing (of 1; may have a multi-part configuration)
13 Accommodation space (formed by 11 or between 5)
14 Observation system
15 Imaging optical unit
16 Object plane (of 1; 2 is located there)
17 Optical axis (of 7)
18 Optical axis (of 15)
19 Deflection optical unit (configured in particular as a deflection prism and/or by means of mirror surfaces)
20 Light source
21 Illumination light beam path
22 Parallax angle
23 Intermediate image plane
24 Angle of incidence (angle between the surface normal of 16 and incident 10)
25 Oblique illumination
26 Optical lens
27 Optical axis (of 6)
28 Edge region (of 26)
29 Light guide
30 Prism
31 Intermediate illumination field
32 Microlens
33 Actuator
34 Controller
35 Control signal
36 Intensity profile
37 Surgical robot
38 Arm (of 37)
39 Monitor
40 Patient
41 Work region
42 Central plane
43 Microscope
44 Optical axis (of 3/15)
45 Optical stop

The invention claimed is:

1. An illumination system for creating an illumination field in an object plane for use with an associated imaging system, the illumination system comprising:
    a light source,
    an optical collimator for collimating illumination light emitted by the light source,
    two illumination light arms, which each form an illumination light beam path and each create an illumination field in the object plane, and
    a beam splitter which splits the illumination light emitted and collimated by the optical collimator into the two illumination light arms, wherein
    the beam splitter comprises as a free-beam optical unit and
    each of the two illumination light arms comprises a respective beam shaping optical unit and in each case a respective projection optical unit downstream of the respective beam shaping optical unit in the respective illumination light beam path.

2. The illumination system as claimed in claim 1, further comprising a housing which houses the entire illumination system, the housing having a horseshoe shape or C-shape, and the two illumination light arms also form the horseshoe shape/C-shape and/or are opposite one another and form an accommodation space therebetween.

3. The illumination system as claimed in claim 1, wherein each of the illumination light arms comprises a deflection optical unit which deflects the illumination light emitted by the respective beam shaping optical unit to the respective projection optical unit, such that a respective optical axis of the respective projection optical unit makes an angle with a plane in which the two illumination light arms are located.

4. The illumination system as claimed in claim 1, wherein the respective projection optical unit is arranged off-center in relation to an optical axis of the respective associated beam shaping optical unit in order thus to form a respective oblique illumination in relation to the object plane.

5. The illumination system as claimed in claim 1, wherein the respective beam shaping optical unit comprises at least one respective microlens array which converts an intensity distribution of the illumination light created by the light source and incident on the microlens array into an emanating intensity distribution.

6. The illumination system as claimed in claim 1, wherein the respective beam shaping optical unit in each case comprises a respective pair of two microlens arrays which have a common optical axis, and a distance between the two microlens arrays is adjustable.

7. The illumination system as claimed in claim 6, wherein the distance between the two microlens arrays is adjustable by a setting device configured as an actuatable actuator, and the illumination system further comprises an interface configured to receive control commands for actuating the actuator.

8. The illumination system as claimed in claim 1, wherein the respective beam shaping optical unit in each case comprises a condensing optical unit downstream of the respective at least one microlens array in the respective illumination light beam path, the respective condensing optical unit is configured to use the illumination light to create a respective sharp rectangular intermediate illumination field in an intermediate image plane.

9. The illumination system as claimed in claim 1, wherein the respective projection optical unit comprises at least one optical element which is displaceably arranged across an axis of the respective illumination beam path, in order to adapt a respective parallax angle by displacing the optical element.

10. The illumination system as claimed in claim 9, wherein at least one of a) respective optical axes of the two projection optical units make an angle of at least 2.0° with respect to one another, b) a two-sided, oblique illumination is providable using the illumination system, or c) an included angle between the optical axes of the two projection optical units is adjustable by displacing the displaceably arranged optical element of the respective projection optical unit.

11. The illumination system as claimed in claim 1, wherein the beam splitter is arranged centrally in relation to the two illumination light arms such that optical path lengths of the two illumination light arms correspond, or the beam splitter is arranged off-center in relation to the two illumination light arms such that optical path lengths of different length arise in the two illumination light arms.

12. An observation system, comprising
at least one of the illumination systems as claimed in claim 1, and
an imaging system having an image sensor.

13. The observation system as claimed in claim 12, wherein at least a part of an imaging optical unit of the imaging system is inserted into an accommodation space formed by a housing of the illumination system, such that at least one of a) the imaging optical unit is arranged centrally in relation to the two illumination light arms of the illumination system, or b) an optical axis of the imaging optical unit and optical axes of the two projection optical units are located in a common observation plane.

14. The observation system as claimed in claim 13, wherein the imaging system is configured to create sharp images within a work region of differently large work distances from the object plane, a central plane is located in a middle of the work region and the two illumination fields created by the two illumination light arms completely overlap in the central plane.

15. A method of illuminating an object plane using the illumination system as claimed in claim 1, the method comprising:
creating an illumination field by two overlapping oblique illuminations provided by the illumination system, wherein at least one of: a) the two oblique illuminations each form an angle of incidence with respect to a surface normal of the object plane which is at least 2.0°, b) a size of the illumination field is adapted by tuning the respective beam shaping optical unit in response to an adaptation of an optical zoom of an associated imaging system, or c) a respective angle of incidence of the respective oblique illumination is adapted by displacing an optical element of the projection optical unit.

16. A method for creating an illumination field in an object plane, the method comprising:
emitting an illumination light by a light source, collimating the illumination light by an optical collimator, and splitting the collimated illumination light between two illumination light arms by a beam splitter embodied as a free-beam optical unit,
initially shaping the split the illumination light by a respective beam shaping optical unit in each of the two illumination light arms such that a respective intermediate illumination field is created, and
subsequently projecting the respective intermediate illumination field into the object plane by a respective projection optical unit.

17. The method as claimed in claim 16, wherein the respective intermediate illumination field is created by at least one respective microlens array and a downstream condensing optical unit, and the light source creates a rotationally symmetric and/or non-rectangular intensity distribution of the illumination light.

18. The method as claimed in claim 16, wherein the illumination light emitted by the respective projection optical unit is incident on the object plane at a respective angle of incidence, as measured with respect to a surface normal of the object plane, such that an oblique illumination is formed in each case.

19. The method as claimed in claim 18, wherein the respective angle of incidence, at which the respective illumination light emitted by the respective projection optical unit is incident on the object plane, is adapted by displacing an optical element of the respective projection optical unit in a range for the respective angle of incidence of [2.0°-10.0°].

* * * * *